(No Model.)
J. A. FLINT.
PNEUMATIC OVERSHOE.
No. 584,866. Patented June 22, 1897.
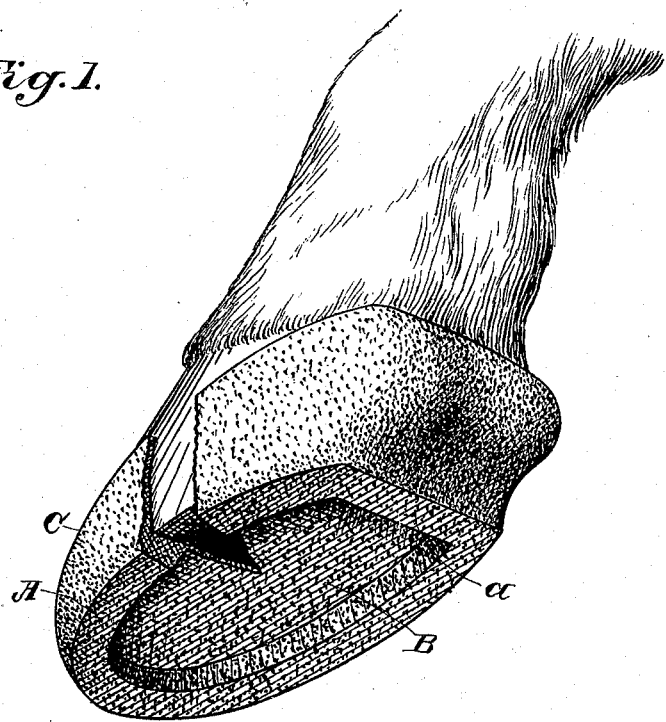
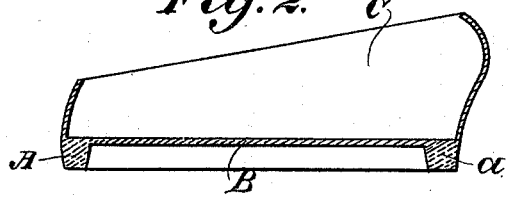
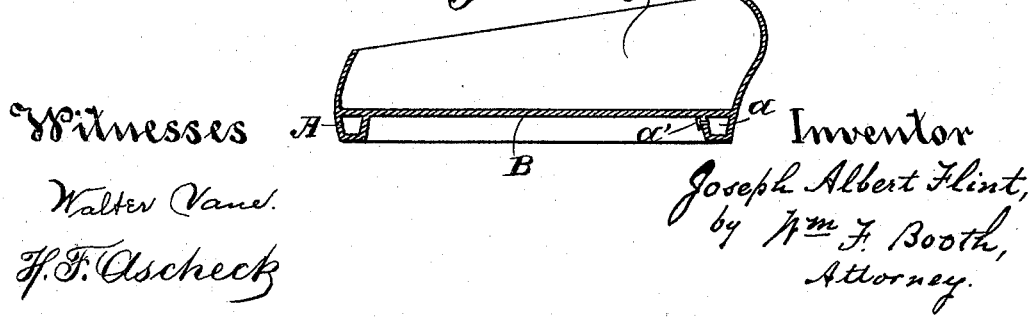
Witnesses
Walter Vane.
H. F. Ascheck.
Inventor
Joseph Albert Flint,
by Wm. F. Booth,
Attorney.
THE NORRIS PETERS CO., PHOTO-LITHO., WASHINGTON, D. C.

UNITED STATES PATENT OFFICE.

JOSEPH ALBERT FLINT, OF SAN FRANCISCO, CALIFORNIA.

PNEUMATIC OVERSHOE.

SPECIFICATION forming part of Letters Patent No. 584,866, dated June 22, 1897.

Application filed March 1, 1897. Serial No. 625,486. (No model.)

*To all whom it may concern:*

Be it known that I, JOSEPH ALBERT FLINT, a citizen of the United States, residing in the city and county of San Francisco and State of California, have invented certain new and useful Improvements in Rubber Horseshoes; and I do hereby declare the following to be a full, clear, and exact description of the same.

My invention relates to the class of horseshoes; and it consists of a horseshoe the tread or sole of which is made of rubber of a general horseshoe shape, with connected extremities, and capped with a top sheet of rubber, to lie immediately under the sole of the horse's hoof, said tread or sole being made hollow and provided with means by which it may receive and retain compressed air and having extending upwardly from its periphery a sheath or upper of rubber, made to conform to and to elastically fit over the hoof and over and into the heel thereof, said sheath or upper being adapted to hold the shoe to the hoof and permit it to be readily applied thereto and removed therefrom.

The object of my invention is to provide a rubber shoe adapted to be easily fitted to a horse's foot and be readily removed therefrom, said shoe keeping the horse from slipping on the street and preventing corns, cracks, and thrush in the feet. It is economical and can be taken off in the stable. For running or trotting horses the pneumatic sole will be found advisable, as it will tend to increase speed.

Referring to the accompanying drawings, Figure 1 is a perspective view showing the application of the shoe to the foot. Fig. 2 is a sectional view. Fig. 3 is a view showing the pneumatic tread or sole of the shoe.

A is the tread or sole of the shoe. It is made of rubber thick enough to be durable and in Fig. 2 is shown solid; but it is best made hollow, as shown in Fig. 3. It has the shape of the ordinary horseshoe, with its extremities connected transversely by the rubber bar $a$. Over the entire top of the tread or sole and covering and protecting the sole of the horse's foot, when the shoe is applied, is a cap-sheet B of rubber, which serves the purpose of keeping the tread or sole A from spreading and the further purpose of keeping the sole of the horse's foot free from dirt and preserving it from injury. Extending upwardly from the periphery of the tread or sole A is a sheath or upper C of rubber. This conforms to the shape of the horse's hoof, rising over the toe and the outside and inside quarters thereof and lying high enough to insure remaining in position, while at the back it rises over the heel-points and fits well and snugly into the heel. The sheath as a whole thus fits the hoof with sufficient elasticity and closeness to hold the shoe to its place and at the same time permit it to be readily applied for use and to be as easily taken off when the horse is in the stable.

In the best construction the tread or sole A is made hollow, as I have shown in Fig. 3, and is provided in any suitable part with a valve-nipple, such as I have indicated at $a'$, whereby air may be forced into said tread or sole and compressed therein, thus making it pneumatic, which construction will tend to speed.

Horseshoes made in accordance with my invention are readily applied to and removed from the feet, will protect the hoof, will prevent slipping, and will also prevent many of the injuries and diseases to which the hoof is subject.

Having thus described my invention, what I claim as new, and desire to secure by Letters Patent, is—

1. A horseshoe, comprising a tread or sole of rubber, made hollow and provided with means by which it may receive and retain compressed air, and a sheath or upper of rubber extending from the periphery of the tread or sole and adapted to elastically fit the hoof and hold the shoe in place.

2. A horseshoe, comprising a pneumatic tread or sole of rubber, a cap-plate of rubber on top of said tread or sole and covering the entire sole of the hoof, and a sheath or upper of rubber extending from the periphery of the tread or sole and adapted to elastically fit the hoof and hold the shoe in place.

In witness whereof I have hereunto set my hand.

JOSEPH ALBERT FLINT.

Witnesses:
  W. N. KEMPSTON,
  JAMES L. KING.